United States Patent Office 2,849,499
Patented Aug. 26, 1958

2,849,499

COMPOSITION OF MATTER HAVING THE FORMULA $C_{10}Cl_{12}$ AND PROCESS FOR ITS PREPARATION

Earl T. McBee, West Lafayette, and James D. Idol, Jr., Lafayette, Ind., assignors to Purdue Research Foundation, Lafayette, Ind., a corporation of Indiana No Drawing. Application June 27, 1955
Serial No. 518,397

2 Claims. (Cl. 260—648)

The present invention is concerned with a novel composition of matter having the empirical formula $C_{10}Cl_{12}$. The composition is further identified as being obtained in the form of colorless, needle-like crystals melting at 221 to 223 degrees centigrade having an absorption maximum at 232 millicrons in the ultraviolet spectra obtained in spectroscopically pure n-hexane at a concentration of $5.82 \times 10^{-5}$ molar.

The composition can be made by a process involving the interaction of $C_{10}Cl_{10}$ and chlorine under the accelerating influence of light or heat. The process is preferably conducted by introducing chlorine, preferably in gaseous form, into a solution of $C_{10}Cl_{10}$ in a substance which is liquid at room temperatures and which does not chlorinate under the conditions employed, while irradiating the reaction mixture. The non-chlorinatable liquid, which can be carbon tetrachloride, hexachloro butadiene, pentachloroethane, and the like, is then removed as by evaporation from the reaction product and the product is dissolved in a solvent such as benzene, and purified by recrystallization. The preparation of the starting material $C_{10}Cl_{10}$, bis(pentachlorocyclopentadienyl), will be hereinafter described.

The following description illustrates the manner and process of making the said composition and represents the best mode of conducting the process contemplated by us:

PREPARATION OF $C_{10}Cl_{10}$ STARTING MATERIAL

In a flask equipped with a stirrer and thermometer there was suspended 60 grams of cuprous chloride in 300 milliliters of 95 percent ethanol and 60 milliliters of water. To the solution was added 135 grams of hexachlorocyclopentadiene. The reaction mixture was stirred for two hours while maintaining the temperature below about 35 degrees centigrade after which the liquid phase was decanted from the sludge which had formed. The sludge was then washed in the reaction vessel with 300 milliliters of water which had been acidified with 10 milliliters of concentrated hydrochloric acid. After stirring this mixture for ten minutes and allowing it to stand for one hour, the liquid was decanted and the sludge was then washed twice with 100 milliliter portions of 95 percent ethanol. The solid material was slurried with the ethanol by means of an efficient mechanical stirrer. The temperature of the wash liquid was maintained at about 50 degrees centigrade by means of a steam cone and then allowed to cool. The washed residue, light tan in color, was separated from the ethanol by suction filtration and was air dried, yielding a fine powder which was dissolved in petroleum ether (B. P. 60-70 degrees centigrade). The resulting solution was decolorized twice with activated charcoal, and the light yellow filtrate was allowed to stand. Upon evaporation of the ether, 82 grams of $C_{10}Cl_{10}$ in the form of clear, light yellow, tabloid-shaped crystals was obtained, melting at 121 degrees to 122 degrees centigrade. A silver nitrate test in ethanol at 25 degrees centigrade was negative, indicating no active chlorine present in the crystals. Analyses for carbon and chlorine corresponded very closely to the theoretical composition $C_{10}Cl_{10}$.

Example 1.—Preparation of $C_{10}Cl_{12}$—Light

In 200 milliliters of carbon tetrachloride there was dissolved 50 grams of $C_{10}Cl_{10}$, obtained as aforesaid, and the solution was placed in a Vycor tube equipped with a gas dispersion disc, internal cooling coils, and a reflux condenser. The tube was irradiated by two 30-watt fluorescent lamps while 100 grams of chlorine was introduced into the solution at a substantially uniform rate over a period of twelve hours, the reaction mixture being maintained at a temperature of approximately 15 degrees centigrade. The reaction mixture was then removed from the tube and the solvent evaporated. The solid remaining after the evaporation of the carbon tetrachloride was dissolved in 150 milliliters of benzene and decolorized with activated charcoal. After filtration, the benzene was partially evaporated and colorless, crystalline needles were obtained having a melting point of 221 to 223 degrees centigrade. Separate analyses of the crystals showed them to contain 77.89 percent and 78.05 percent by weight chlorine, corresponding to a theoretical chlorine content of 77.89 percent by weight. Analyses for carbon showed 22.12 percent by weight, corresponding to a theoretical carbon content of 22.01 percent.

Example 2.—Preparation of $C_{10}Cl_{12}$—Heat

Five grams of $C_{10}Cl_{10}$, prepared as above, was sealed in a Carius tube at minus 194 degrees centigrade with ten grams of chlorine. The tube was heated in a furnace at approximately 200 degrees centigrade for twelve hours. After cooling, the tube was chilled to minus 194 degrees centigrade, opened, and the excess chlorine allowed to evaporate. The residue was recrystallized from benzene, yielding four grams of colorless needles. When these crystals were admixed with the product of Example 1, no depression of melting point occurred, thus establishing the identity of the product.

The manner of using our composition as an intermediate for the preparation of a substance also analyzing to the empirical formula $C_{10}Cl_{12}$ but melting at 485 degrees centigrade and having valuable pesticidal properties is illustrated by the following:

Four grams of $C_{10}Cl_{12}$, prepared according to Example 1, was dissolved in 100 milliliters of methylene chloride which had been distilled from anhydrous aluminum chloride. Powdered anhydrous aluminum chloride (0.5 gram) was then added to the distillate and the mixture was refluxed overnight. The darkened mixture was poured into water which had been made acidic with hydrochloric acid and the methylene chloride was then layered off, washed with water, and dried. Evaporation of the solvent from the organic layer so-treated yielded 3.7 grams of very light yellow crystals with a melting point of 485 degrees centigrade, analyzing to $C_{10}Cl_{12}$. The material so-prepared was formulated as a dusting composition by intermixture with talc so that the formulation contained 25 percent by weight $C_{10}Cl_{12}$ having a melting point of about 485 degrees centigrade. This formulation showed a 75 percent knockdown in a period of twenty-four hours, when applied in a contact knock-down test to the confused flour beetle (*Tribolium confusium*).

We claim:

1. A composition of matter having the empirical formula $C_{10}Cl_{12}$ and melting at 221 to 223 degrees centigrade.

2. The process which includes: introducing chlorine into a dispersion of bis(pentachlorocyclopentadienyl); irradiating the reaction mixture at a temperature of approximately 15 degrees centigrade; and separating from the reaction mixture a composition having the empirical formula $C_{10}Cl_{12}$ melting at 221 to 223 degrees centigrade.

References Cited in the file of this patent

UNITED STATES PATENTS

| | | |
|---|---|---|
| 2,519,190 | Hyman | Aug. 15, 1950 |
| 2,732,409 | Ladd | Jan. 24, 1956 |